United States Patent

Tesker

Patent Number: 5,290,201
Date of Patent: Mar. 1, 1994

[54] COMBINE WITH MMOVEABLE BODY AND TANDEM DRIVE WHEELS

[76] Inventor: Henry L. Tesker, 2640 Shady Lane Rd., Saukville, Wis. 53080

[21] Appl. No.: 897,047

[22] Filed: Jun. 11, 1992

[51] Int. Cl.$^5$ .................... A01D 41/02; A01D 67/00; A01D 69/03; B62D 61/10

[52] U.S. Cl. ...................... 460/116; 56/10.8; 56/11.6; 56/11.9; 180/9.46; 180/24.11; 180/251; 180/242; 180/900

[58] Field of Search ........... 56/10.1, 10.8, 11.6, 56/11.9, 14.6, DIG. 10, DIG. 6; 460/116, 119, 59; 180/24.11, 24.12, 357; 280/677

[56] References Cited

U.S. PATENT DOCUMENTS

| | | |
|---|---|---|
| 1,451,127 | 4/1923 | Thornton . |
| 2,748,879 | 6/1956 | Bailey .................. 180/24.11 X |
| 2,878,883 | 3/1959 | France et al. ............. 180/9.46 |
| 3,324,964 | 6/1967 | Davis ..................... 180/900 X |
| 4,016,946 | 4/1977 | Demichelis ................ 180/242 |
| 4,091,888 | 5/1978 | Yamanaka et al. ............ 180/82 |
| 4,121,680 | 10/1978 | van der Lely ............. 180/900 X |
| 4,150,525 | 4/1979 | DeBusscher et al. ........ 460/119 X |
| 4,560,018 | 12/1985 | Satzler .................. 180/251 X |

Primary Examiner—Stephen J. Novosad
Attorney, Agent, or Firm—Emrich & Dithmar

[57] ABSTRACT

An agricultural combine such as used in the harvesting of crops includes oscillating or fixed forward tandem drive wheels which are coupled to the combine's support frame, or undercarriage, to provide a smooth ride over rough fields and a more uniform crop cutting height above the soil. The combine also includes a body typically housing a diesel engine, operator controls such as in an enclosed cab, a grain and residue separating system, a grain storage bin, and an auger for off-loading the harvested grain. The combine body, which also typically has an array of row crop heads disposed on a forward portion thereof, is disposed on and coupled to the support frame in a slidable manner permitting the body to move forward to distribute the weight primarily over the tandem drive wheels for improved traction for operating in muddy fields and to accommodate larger grain loads. The combine body may also be slid rearward on the support frame to distribute sufficient weight over the aft steerable wheels to facilitate turning of the combine such as at the end of a field. The tandem wheel arrangement is also adapted to accommodate a drive track arrangement for even greater traction, with steering provided by an independent track drive or braking arrangement.

30 Claims, 7 Drawing Sheets

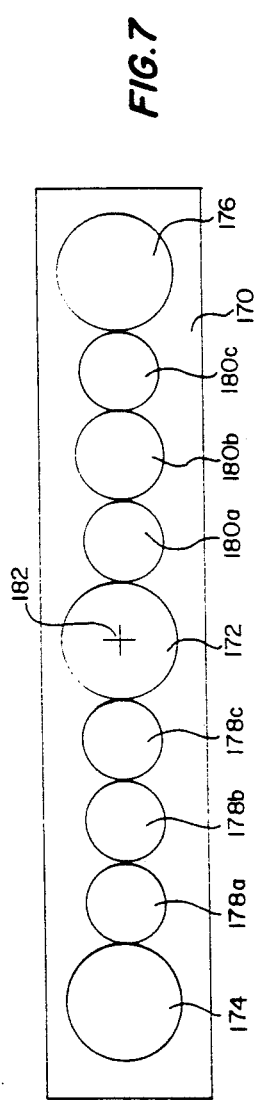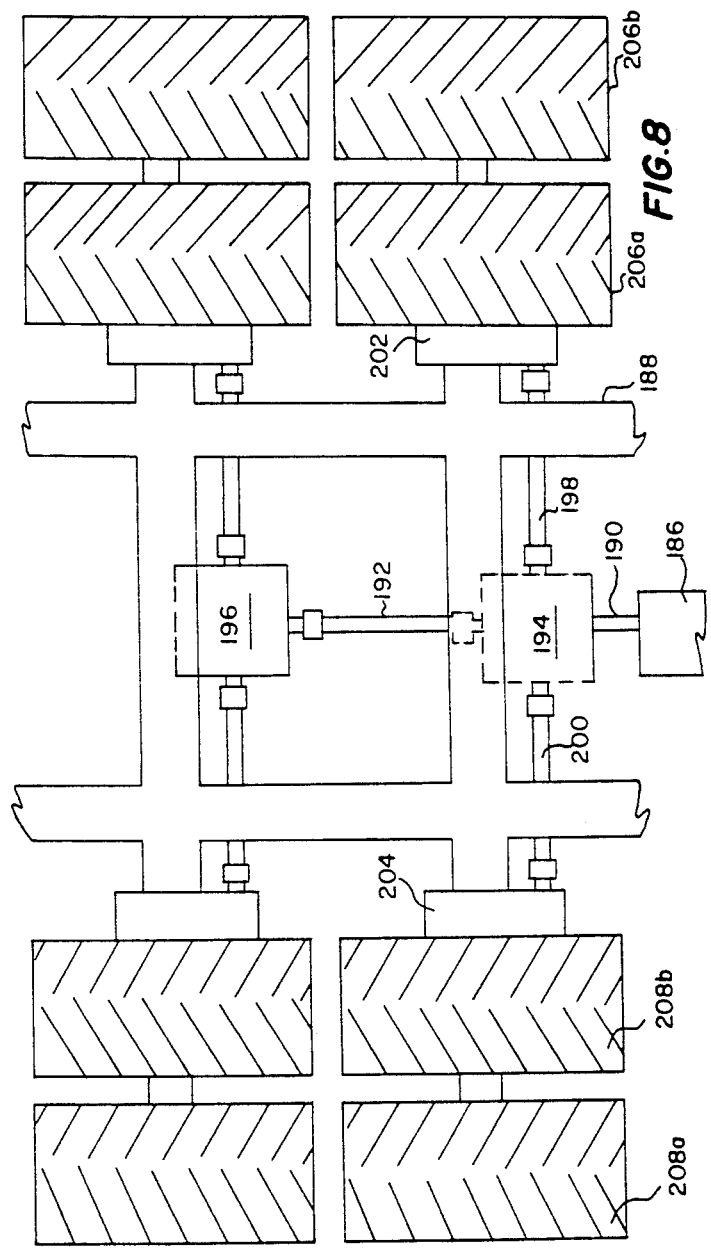

COMBINE WITH MMOVEABLE BODY AND TANDEM DRIVE WHEELS

FIELD OF THE INVENTION

This invention relates generally to an apparatus for the harvesting of grain and is particularly directed to a combine with tandem drive wheels and a moveable body for improved weight distribution.

BACKGROUND OF THE INVENTION

A combine is an agricultural vehicle used in the harvesting of crops. The combine is typically self-propelled and includes an upper body and a lower support frame, or undercarriage. The upper body has disposed on a forward portion thereof a header assembly and further includes an aft crop processing section and drive mechanism. The drive mechanism typically includes a diesel engine and operator controls which are generally in an enclosed cab. The crop processing section generally includes the combination of a rotating cylinder and concave combination, a series of moving sieves, and a blower arrangement for directing chaff rearward in the combine for discharge therefrom, while allowing the grain to fall under gravity to a lower portion of the combine body. The grain is then displaced upward by means of an elevator for discharge into a storage tank. An off-loading grain auger disposed within the storage tank is typically employed to unload the grain into a transport vehicle such as a truck.

The combine generally includes a pair of forward drive wheels and a pair of aft steerable wheels for turning the combine. The threshing system is disposed immediately aft of the header assembly for receiving the grain and crop residue and allowing the grain to drop downward under the influence of gravity while allowing the separated crop residue to be displaced rearward for discharge from the combine. The threshing system and grain tank are typically disposed intermediate the forward drive wheels and the aft steerable wheels, with the grain tank positioned behind the drive wheels. This arrangement increases the weight on the aft steerable wheels and reduces the weight on the forward drive wheels resulting in reduced drive traction for the combine. This reduced drive traction restricts maneuverability of the combine, particularly in muddy fields, and also limits the combine's grain storage capacity. A large grain storage capacity reduces the frequency of harvested grain off-loading and allows for extended combine operation without interruption for more efficient grain harvesting.

The present invention addresses the aforementioned limitations of the prior art by providing a combine with a movable upper body on a lower support frame which allows for shifting in the weight distribution of the combine to a forward location over tandem drive wheels for improved traction or rearward over the combine's aft steerable wheels to facilitate turning of the combine such as at the end of a field.

OBJECTS AND SUMMARY OF THE INVENTION

Accordingly, it is an object of the present invention to provide a combine with improved mobility particularly in muddy, wet fields.

It is another object of the present invention to provide a combine with increased grain carrying capacity.

A further object of the present invention is to provide a forward tandem drive wheel arrangement for a combine for improved traction and increased grain storage and transport capacity.

Yet another object of the present invention is to provide for the shifting of a combine body on its lower support frame forward over its drive wheels for improved traction or rearward over its aft steerable wheels to facilitate combine turning such as at the end of a field.

A still further object of the present invention is to provide an oscillating tandem wheel arrangement for a combine for a smoother ride and more uniform crop cutting height above the soil.

Still another object of the present invention is to improve traction and mobility of a combine, particularly in muddy areas, by means of a tracked drive arrangement including tandem drive wheels.

These objects of the present invention are achieved and the disadvantages of the prior art are eliminated by a combine for harvesting grain comprising: a lower support frame having a plurality of wheels including first and second pairs of forward tandem wheels and an aft pair of steerable wheels; a drive system coupled to the forward tandem wheels for displacing the combine; an upper body including a forward header assembly for receiving grain-bearing crops, an intermediate crop threshing arrangement for separating the grain from crop residue, and a bin for storing the thus separated grain; a coupling for connecting the upper body to the lower support frame in a sliding manner; and a displacement system coupled to the lower support frame and to the upper body for displacing the upper body between a forward position on the lower support frame wherein the upper body is disposed primarily over the forward tandem drive wheels for improved traction and stability and an aft position on the lower support frame wherein an increased position of the upper body is disposed over the aft steerable wheels for improved maneuverability of the combine.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 7 is a side elevation view of an oscillating box beam with drive, idler and driven gears in accordance with one embodiment of the present invention; and FIG. 8 is a partial plan view of a dual differential drive arrangement for a pair of dual tandem wheels in accordance with another embodiment of the present invention.

DETAILED DESCRIPTION OF THE PREFERRED EMBODIMENTS

Figure 1A:
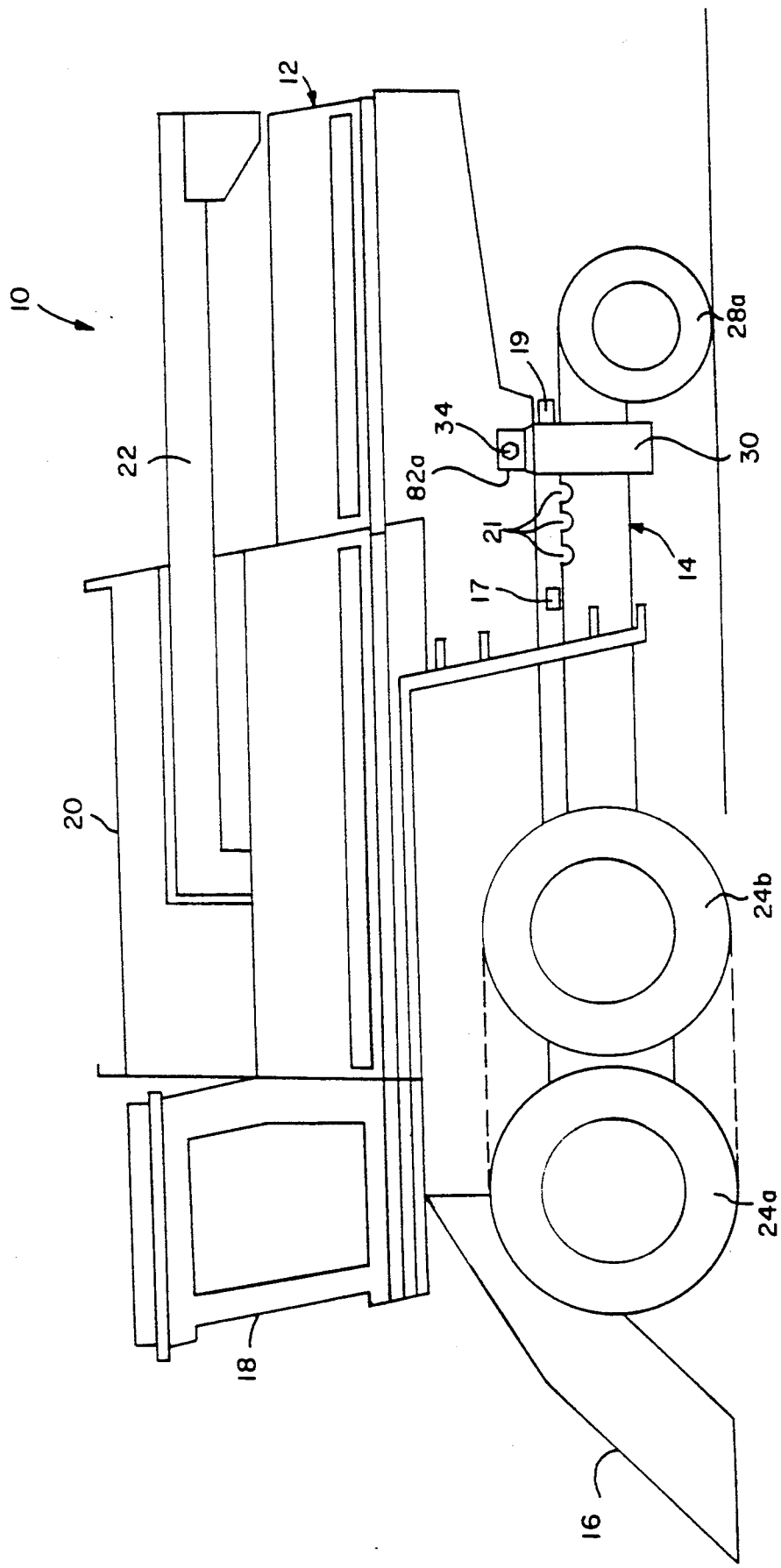
FIGS. 1a and 1b are side elevation views of a combine in which the tandem drive wheels and moveable body of the present invention is intended for use respectively showing the combine body in full aft and full forward positions on its undercarriage.
Figure 1B:
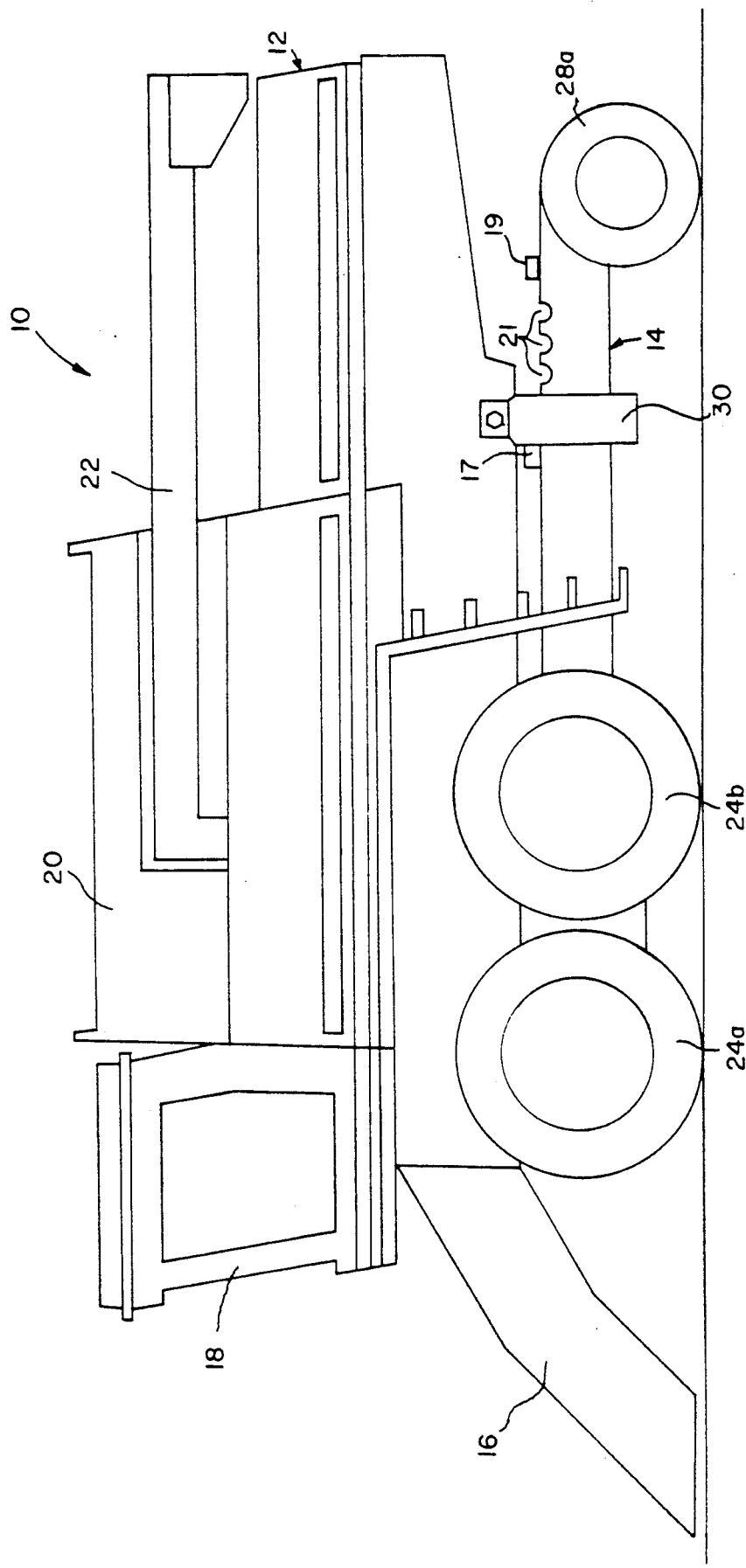

Referring to FIGS 1a and 1b, there is shown a side elevation view of a combine 10 in which the moveable body and tandem drive wheel arrangement of the present invention is intended for use. Combine 10 includes an upper body 10 and a lower undercarriage, or support frame, 14. Attached to a forward portion of the body 10 is a header assembly 16 which typically is substantially wider than the combine body and includes a plurality of spaced corn or row crop heads which are adapted for engaging the crops and removing the grain therefrom. The thus removed grain, in combination with crop residue such as husks in the case of corn harvesting, is then automatically delivered to an aft drive and processing section within the combine body 10, which is not shown in the figure for simplicity. The drive section typically includes a diesel engine for propelling the combine 10 and for powering a threshing system which separates the grain from the crop residue. The processing section is typically comprised of the combination of a concave and rotating cylinder, various moving sieves, and a residue discharge section in the aft of the body 10. The body 10 further includes a grain tank 20 for holding the thus separated grain which is off-loaded from the combine 10 by means of an auger 22. A cab 18 is typically disposed on a forward portion of the combine body 12 for accommodating the combine operator. As thus far described, combine 10 is typical of combines used in the harvesting of grain.

Figure 2:
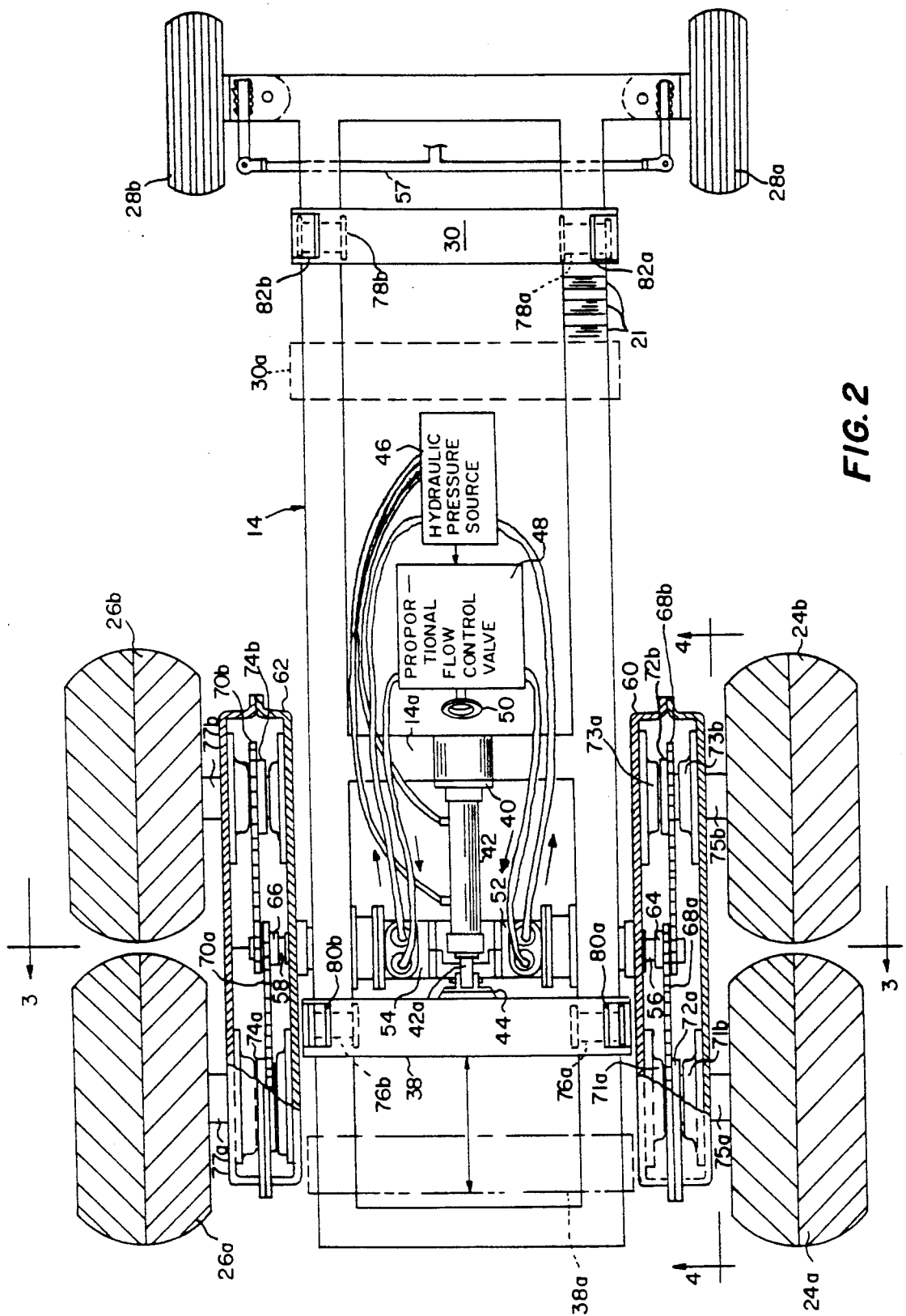
FIG. 2 is a plan view shown cut away and partially in simplified schematic diagram form of a combine undercarriage for supporting a moveable body and a tandem drive wheel arrangement in accordance with the principles of the present invention.
Figure 3:
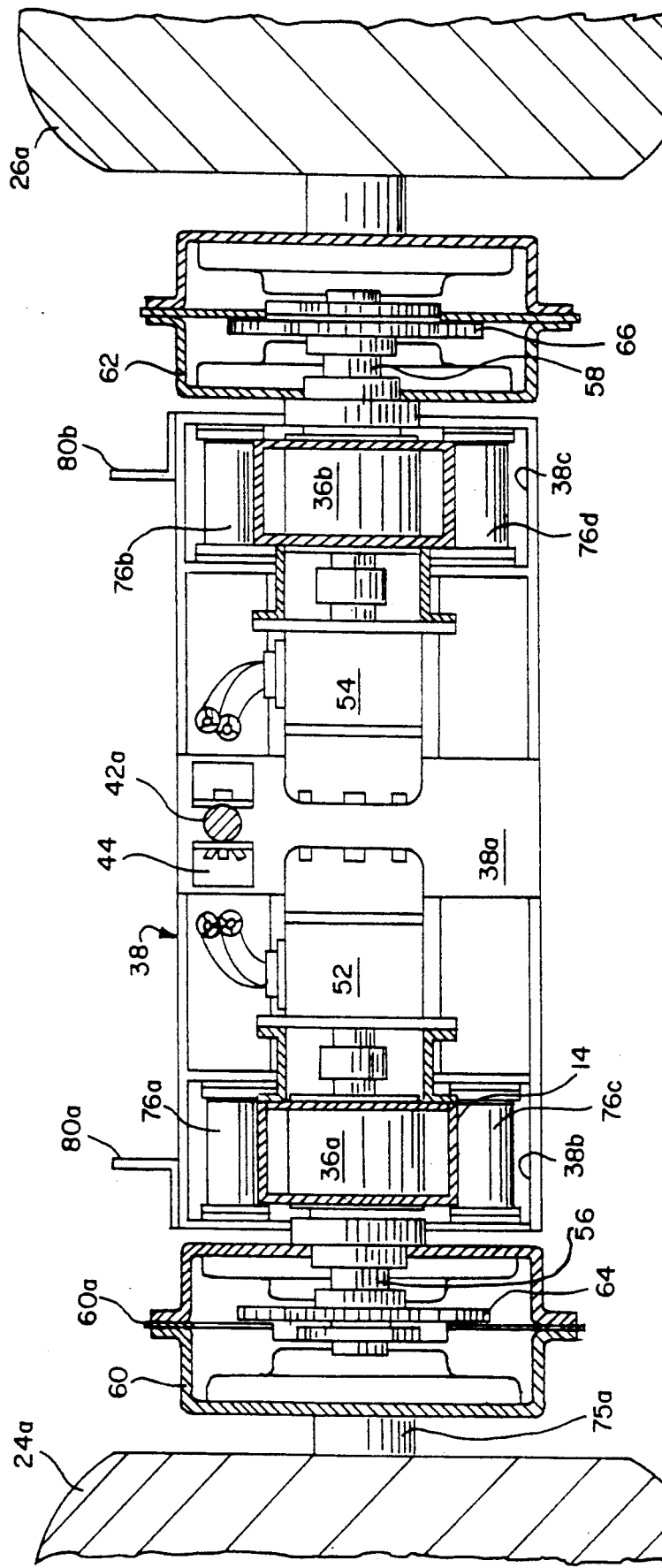
FIG. 3 is a sectional view of the tandem drive wheel arrangement shown in FIG. 2 taken along site-line 3—3 therein.

In accordance with the present invention and with reference to FIGS 2 and 3 as well as to FIGS. 1a and 1b, additional details of combine 10 with the inventive tandem drive wheel arrangement and moveable body 12 on undercarriage 14 will now be described. FIG. 2 is a plan view of undercarriage 14 and various components of the tandem wheel drive and moveable body system shown partially in schematic diagram form and partially cut away. FIG. 3 is a sectional view of the tandem drive wheel arrangement shown in FIG. 2 taken along siteline 3—3 therein. Rotationally mounted to respective lateral aft portions of undercarriage 14 are first and second steerable wheels 28a and 28b. Steerable wheels 28a, 28b are each coupled to steering linkage 57 and may be further coupled to a steering wheel (not shown for simplicity) which is located in the combine's cab 18 to allow the operator to turn the combine 10 such as at the end of a field. Conventional couplings and linkage may be used to connect the steering wheel to the steering linkage 57 to allow for directional control of the steerable wheels 28a and 28b. Another arrangement for controlling steering of the combine 10 by means of a steering wheel 50, a hydraulic pressure source 46, and a proportional flow control valve 48 is described in detail below.

Undercarriage 14 is comprised of a high strength tubular steel which is generally rectangular in cross section, having one or more fixed cross members 14a for increased strength. Attached to undercarriage 14 are forward and aft moveable cross frames 38 and 30. The forward and aft moveable cross frames 38, 30 are generally of the same construction and configuration and are comprised of a generally rectangular frame such as shown for the forward moveable cross frame in FIG. 3.

Details of the forward moveable cross frame 38 will now be described, it being understood that a similar description applies to the aft moveable cross frame 30. The forward moveable cross frame 38 includes first and second slots 38b and 38c adjacent respective ends thereof. Each of the end slots 38b, 38c is adapted to receive an adjacent portion of the rectangular tubular undercarriage 14. Disposed in the first end slot 38b is an upper and a lower roller 76a and 76c. Each of the upper and lower rollers 76a, 76c is securely mounted within the first end slot 38b by means of a respective roller pin, or bolt, which are not shown in the figure for simplicity. Each of the upper and lower rollers 76a, 76c is free to rotate within the first end slot 38b. The upper roller 76a is in tight-fitting contact with an upper adjacent portion of the undercarriage 14, while lower roller 76c is in tight-fitting contact with an adjacent lower portion of the undercarriage. The second end slot 38c similarly includes upper and lower rollers 76b and 76d rotationally mounted in the end slot by means of roller pins, or bolts, which also are not shown in the figure for simplicity. Upper roller 76b is in intimate contact with an upper portion of the undercarriage 14, while lower roller 76d is in intimate contact with an adjacent, lower portion of the undercarriage. The four rollers 76a, 76b, 76c and 76d permit the forward moveable cross frame 38 to be linearly displaced along undercarriage 14 while maintaining secure coupling between the moveable cross frame and the undercarriage. A similar four roller arrangement in the aft moveable cross frame 30 allows this moveable cross frame to be linearly displaced on, while remaining securely coupled to, the undercarriage 14. The upper rollers of the aft moveable cross frame 30 are shown in dotted-line form in FIG. 2 as elements 78a and 78b. The forward and aft moveable cross frames 38 and 30 are shown in solid-line form in an aft position on undercarriage 14 in FIG. 2, while these same cross members are shown in dotted-line form in a forward position on the undercarriage and are respectively identified by element numbers 38a and 30a.

Securely mounted to respective upper end portions of the forward moveable cross frame 38 such as by weldments are first and second coupling brackets 80a and 80b. Similarly, securely mounted to respective upper end portions of the aft moveable cross frame 30 are first and second coupling brackets 82a and 82b. Each of the coupling brackets 80a, 80b and 82a, 82b is adapted for secure coupling by conventional means such as coupling bolts or weldments to a lower portion of the combine body 12. This can be seen for the aft moveable cross frame member 30 in FIG. 1 where coupling bracket 82a is securely mounted to a lower portion of the combine's body 12 by means of a mounting bolt 34.

The inventive moveable body arrangement in combine 10 further includes a hydraulic cylinder 42. Hydraulic cylinder 42 is coupled at its butt end by means of a first mounting plate 40 to the fixed cross member 14a of undercarriage 14. Hydraulic cylinder 42 includes an extendable cylinder rod 42a coupled by means of a second mounting plate 44 to the forward moveable cross member 38. Hydraulic cylinder 42 is of the double-acting type and is coupled to a hydraulic pressure source 46. Extension of the cylinder rod 42a from the hydraulic cylinder 42 causes forward displacement (to the left in FIG. 2) of the forward moveable cross frame 38. With the forward moveable cross frame 38 and the aft moveable cross frame 30 coupled to a lower portion of the combine body 12 as described above, extension of the cylinder rod 42a will also cause forward displacement of the combine body and both moveable cross frames in a forward position on undercarriage 14 are shown in dotted-line form in FIG. 2 and are identified as elements 38a and 30a, respectively. With the combine body 12 displaced forward, more of the weight of the combine 10 will be distributed over tandem drive wheels 24a, 24b and 26a, 26b for increased traction such as for use in muddy fields. Retraction of cylinder rod 42a within the hydraulic cylinder 42 will result in aft (to the right) displacement of the forward and aft moveable cross frames 38, 30 as well as the combine body 12 on the undercarriage 14. With the combine body 12 displaced rearward on undercarriage 14, increased combine weight will be distributed over the steerable wheels 28a, 28b to facilitate maneuvering of the combine such as in turning at the end of a field. With the increased traction when the combine body 12 is moved forward, the combine 10 of the present invention is capable of operating with an increased grain storage capacity resulting in a reduction in the number of times the grain in storage bin 20 must be off-loaded during combine operation. Undercarriage 14 may include forward and aft stops 17 and 19 shown in FIGS. 1a and 1b, or other suitable means, for limiting forward and aft displacement of the combine body 12 on its undercarriage. As shown in the figures, with the forward and aft stops 17, 19 attached to an upper portion of undercarriage 14, the forward stop, or stops, limits forward displacement of the body on undercarriage, while rearward displacement of the body on the undercarriage is limited by the aft stop. In addition, an upper portion of undercarriage 14 may be provided with a plurality of spaced recesses 21 also as shown in FIGS. 1a and 1b for receiving a lower portion of the combine body 12 in locking the combine body in position on its undercarriage.

The tandem drive wheel system used in propelling the combine 10 in accordance with the present invention will now be described. Mounted to respective lateral portions of the undercarriage 14 in one embodiment of the present invention are first and second hydraulic motors 52 and 54. Each of the first and second hydraulic motors 52, 54 may be either coupled directly to a hydraulic pressure source 46 or may be coupled to the hydraulic pressure source via a proportional flow control valve 48. Hydraulic pressure source 46 may be conventional in design and operation and is typically powered by the combine's diesel engine for providing hydraulic fluid under pressure to the first and second hydraulic motors 52 and 54. Pressurized hydraulic fluid provided by the hydraulic pressure source 46 to the first and second hydraulic motors 52, 54 allows the hydraulic motors to rotationally displace first and second axles 36a and 36b extending through respective lateral portions of the undercarriage 14 and shown in FIG. 3.

In another embodiment, each of the first and second hydraulic motors 52, 54 may be coupled to the hydraulic pressure source 46 via a proportional flow control valve 48. The proportional flow control valve 48 is coupled to and responsive to rotational displacement of an operator controlled steering wheel 50 for directing hydraulic fluid under pressure to the first and second hydraulic motors 52, 54 in accordance with steering wheel position. In accordance with this embodiment, turning the steering wheel 50 to the right results in increased hydraulic pressure being provided to the first hydraulic motor 52 causing rotational displacement of tandem drive wheels 24a and 24b, while the proportional flow control valve 48 reduces hydraulic fluid flow to the second hydraulic motor 54 preventing, or retarding, rotational displacement of tandem drive wheels 26a and 26b. In this manner, steering of the combine is accomplished by means of the differential driving of the first and second pairs of tandem wheels 24a, 24b and 26a, 26b in response to the rotation of steering wheel 50. A steering arrangement which includes the proportional flow control valve 48 is particularly adapted for the track drive system shown in FIG. 4 and described in detail below. In addition, a combine steering/drive arrangement incorporating the proportional flow control valve 48 which is responsive to the turning of the steering wheel 50 eliminates the requirement for connecting the steering linkage 57 coupled to the aft steerable wheels 28a and 28b to the steering wheel. However, even where the proportional flow control valve 48 is incorporated in the combine's steering/drive system, steering linkage 57 is required to permit the aft steerable wheels 28a, 28b to pivot as the combine turns. In yet another embodiment, the differential drive steering employing the tandem wheels in combination with proportional flow control valve 48 may be used in combination with an arrangement wherein the aft wheels 28a, 28b are turned by means of steering linkage 57 coupled to steering wheel 50.

Each of the first and second hydraulic motors 52, 54 is securely coupled to a respective lateral portion of the undercarriage 14 by conventional means such as a bolt-/mounting bracket combination. Extending outward from the first and second hydraulic motors 52, 54 and through an adjacent portion of the undercarriage 14 are the aforementioned axles 36a and 36b. Mounted to distal ends of the axles 36a, 36b are first and second oscillating wheel mounting housings 60 and 62. Each of the wheel mounting housings 60, 62 is coupled to a distal end of a respective axle 36a, 36b by means of a suitable bearing arrangement. Each of the first and second oscillating wheel mounting housings 60, 62 is preferably comprised of a respective pair of housing halves coupled together in a sealed manner by means of a gasket 60a in combination with a plurality of coupling bolts 65 as shown in the sectional view of FIG. 4. The sealed configuration of each of the first and second oscillating wheel mounting housings 60, 62 isolates the various drive components described below within the wheel mounting housing from the dirt, mud and dust encountered during combine operation. Disposed on a distal end of the first and second axles 36a and 36b and positioned respectively in the first and second oscillating wheel mounting housings 60 and 62 are first and second drive shafts 56 and 58. Within the first oscillating wheel mounting housing 60, the first drive shaft 56 is coupled to a first drive sprocket 64 which, in turn, is respectively coupled to driven sprockets 72a and 72b via drive chains 68a and 68b. Each of the driven sprockets 72a and 72b is maintained in position within the first oscillating wheel mounting housing 60 and is supported by a respective pair of bearings 71a, 71b and 73a, 73b. Each of the driven sprockets 72a, 72b is further coupled to a respective tandem drive wheel 24a and 24b by means of a respective outer axle 75a and 75b. It is via the aforementioned combination of axles and chains and drive and driven sprockets that the first hydraulic motor 52 rotationally drives the first pair of tandem wheels 24a and 24b.

A similar drive arrangement is located on the opposed lateral portion of the undercarriage 14 and includes a second axle 36b coupled to the second hydraulic motor 54 and extending through a lateral portion of the undercarriage 14. Attached to a distal end of the second axle 36b by a suitable sealed bearing is the second oscillating wheel mounting housing 62. Disposed within the second oscillating wheel mounting housing 62 in a sealed manner is the combination of a second drive shaft 58, a second drive sprocket 66, driven sprockets 74a and 74b, and drive chains 70a and 70b. The drive arrangement disposed within the second oscillating wheel mounting housing 62 is similar to that within the first oscillating wheel mounting housing 60 described in detail above. Attached to the driven sprockets 74a and 74b and extending from the second oscillating wheel mounting housing 62 through sealed bearings are outer axles 77a and 77b, respectively. Attached to and supported by outer axles 77a and 77b are a second pair of tandem wheels 26a and 26b. The second hydraulic motor 54 thus provides for rotational displacement of the second pair of tandem wheels 26a, 26b. The first and second wheel mounting housings 60, 62 and the tandem wheels attached thereto are free to oscillate about first and second drive shafts 56, 58, respectively, as the combine traverses a field. While the drive arrangement of FIG. 2 shows a single hydraulic motor driving a pair of tandem wheels, the present invention also contemplates coupling a hydraulic motor to each tandem wheel for increased power.

Figure 4:
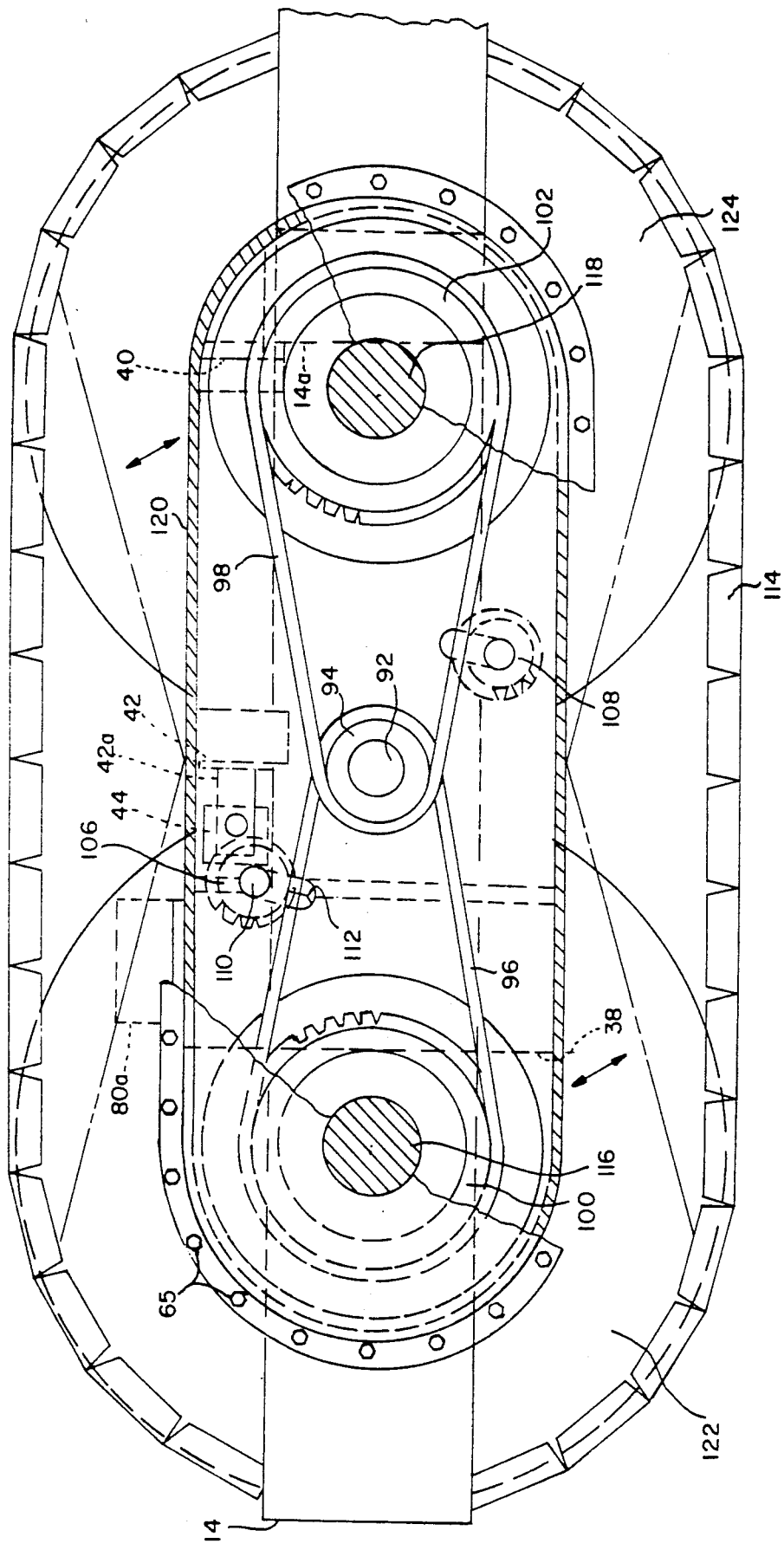
FIG. 4 is a sectional view of the tandem drive wheel arrangement shown in FIG. 2 taken along site-line 4—4 therein for a track drive system.

Referring to FIG. 4, there is shown a partially cut away sectional view of the drive arrangement shown in FIG. 2 taken along sight line 4—4 for the case of a track drive system. As shown in FIG. 4, a drive sprocket 94 is mounted to and rotates with a drive shaft 92. Coupled to the drive sprocket 94 by means of respective drive chains 96 and 98 are first and second driven sprockets 100 and 102. The first driven sprocket 100 is coupled to a first outer axle 116, while the second driven sprocket 102 is coupled to a second outer axle 118. Each of the first and second outer axles 116, 118 is coupled to a respective tandem drive wheel, which are not shown in the sectional view of FIG. 4.

Also as shown in FIG. 4, the aforementioned drive and driven sprockets and chains are disposed in a sealed manner within an oscillating wheel mounting housing 120. A plurality of spaced coupling bolts 65 securely couple in a sealed manner paired housing halves of the oscillating wheel mounting housing 120. First and second idler, or tensioned, sprockets 106 and 108 are respectively coupled to the first and second drive chains 96, 98 for maintaining the drive chains under tension. As shown for the case of the first idler sprocket 106, the sprocket is rotationally coupled to a positioning bolt 110 which is disposed within an elongated mounting slot 112. The first idler sprocket 106 is positioned within slot 112 by means of bolt 110 so a to engage the first drive chain 96 and maintain the drive chain under tension. A similar mounting and positioning arrangement is provided for the second idler sprocket 108 which engages and maintains the second drive chain 98 under tension.

Respectively attached to the first and second axles 116, 118 are first and second wheels 122 and 124 in combination with an endless track 114 which may be comprised of rubber. Wheels 122 and 124 are located on the opposed side of the undercarriage 14 from the sprocket and chain drive arrangement shown in FIG. 4 and are coupled to and driven by a similar drive arrangement to that shown in FIG. 4. Disposed about and engaging wheels 122 and 124 is endless track 114 which is rotationally displaced by the tandem drive wheels. The drive arrangement of FIG. 4 provides the combine with increased traction such as for operating in muddy fields or for accommodating increased grain storage capacity during operation. Track 114 may be positioned on drive wheels 122 and 124 by driving the wheels onto the track, connecting ends of the track to form an endless track about the wheels, and inflating the tires to an increased pressure so that they engage and displace the track when rotated. Also shown in dotted-line form in FIG. 4 is the forward moveable cross frame 38, to an upper portion of which is securely attached coupling bracket 80a for attaching the moveable cross frame to the combine's body. The forward moveable cross frame 38 is movably coupled to fixed cross member 14a of the undercarriage 14 by means of the combination of first and second mounting plates 40 and 44 and hydraulic cylinder 42 with its extendable rod 42a as described above.

Figure 5:
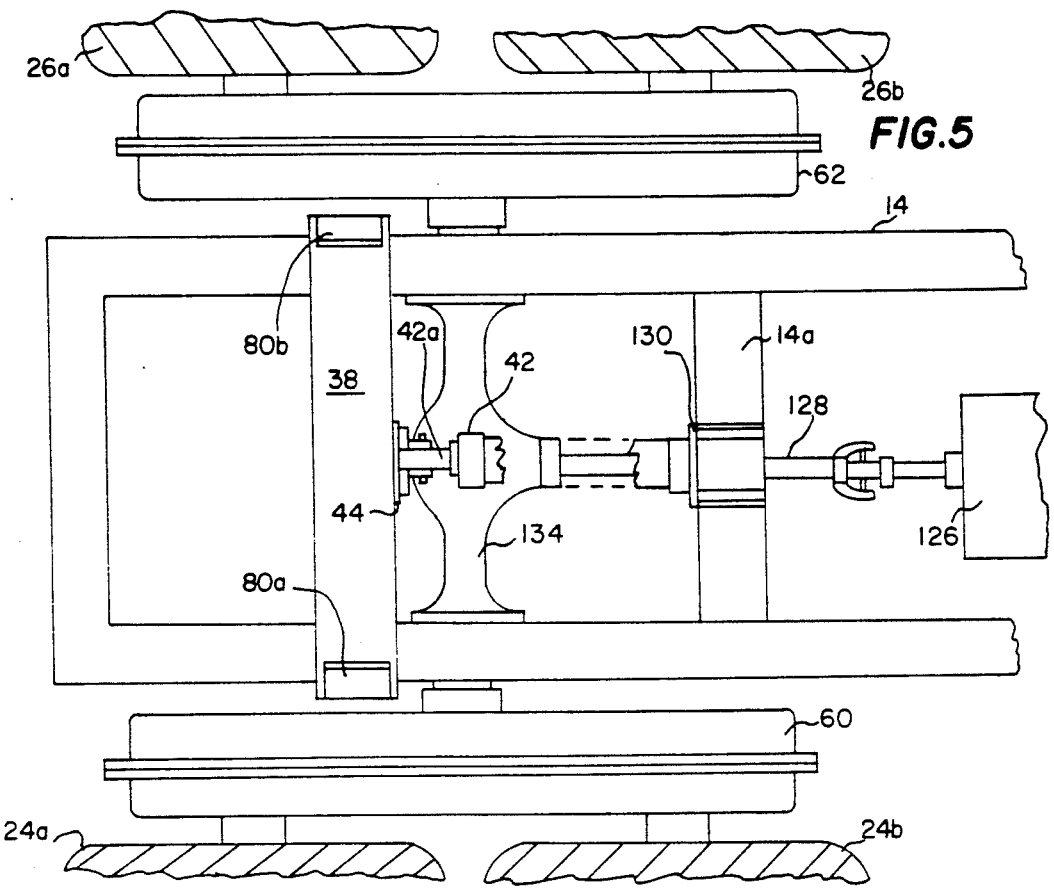
FIG. 5 is a plan view of a portion of the undercarriage of a combine illustrating another embodiment of a drive system for tandem wheels in accordance with the principles of the present invention including the combination of a drive shaft coupled to a diesel engine and a differential.

Referring to FIG. 5, there is shown a partially cut away plan view of another embodiment of a combine drive arrangement in accordance with the principles of the present invention. In the embodiment of FIG. 5, the combine's diesel engine 126 is coupled via a series of pulleys/belts (not shown in the figure for simplicity) and/or a drive shaft 128 to the combine's forward differential drive axle 134. Differential drive axle 134 is, in turn, coupled to forward tandem drive wheels 24a, 24b and 26a, 26b by means of the first and second oscillating wheel mounting housings 60 and 62 and the sprocket and chain combinations described above. The combine's diesel engine 126 provides for rotational displacement of drive shaft 28 and directly drives the tandem drive wheels via a differential (not shown in the figure for simplicity) within the drive axle 134.

Figure 6:
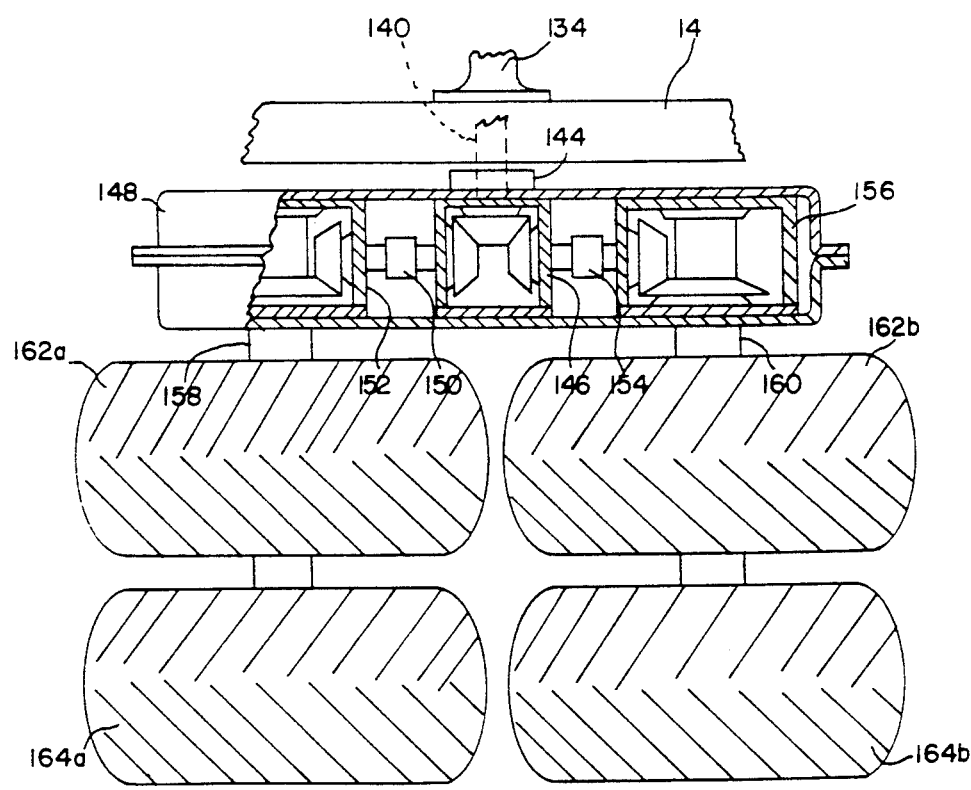
FIG. 6 is a partially cut away plan view of a portion of a dual tandem wheel drive arrangement in accordance with another embodiment of the present invention.

Referring to FIG. 6, there is shown yet another embodiment of a drive arrangement for use in driving tandem wheels of a combine in accordance with the present invention. In the drive arrangement of FIG. 6, the differential axle 134 is coupled to the undercarriage 14 and provides for rotational displacement of a drive shaft 140 extending through the undercarriage. Coupled to the undercarriage 14 is an oscillating wheel mounting housing 148 as previously described, which is coupled to the undercarriage by means of an outer bearing 144. Disposed within the oscillating wheel mounting housing 148 and coupled to drive shaft 140 is a first gear box 146. Second and third gear boxes 152 and 156 are also disposed within the oscillating wheel mounting housing 148 and are coupled to the first gear box 146 by means of first and second splines 150 and 154, respectively. Respectively coupled to the second and third gear boxes 152, 156 are axles 158 and 160. The gear drive arrangement of FIG. 6 allows for rotational displacement of axles 158 and 160 upon rotational displacement of drive shaft 140. As shown in FIG. 6, two pairs of tandem drive wheels 162a, 162b and 164a, 164b are mounted on axles 158 and 160. The dual tandem wheel drive arrangement of FIG. 6 provides even greater traction for the combine drive arrangement of the present invention.

Referring to FIG. 7, there is shown an elevation view of an oscillating box beam 170 for use in another drive system embodiment contemplated by the present invention. The oscillating box beam 170 includes a plurality of aligned gears for driving a pair of tandem wheels (not shown) via a single drive axle (also not shown). The drive axle is coupled to a center drive gear 172 for rotationally displacing the drive gear about axis 182. The drive gear 172 is coupled to a first driven gear 174 by means of a first set of idler gears 178a, 178b and 178c. Similarly, drive gear 172 is coupled to a second driven gear 176 by means of a second set of idler gears 180a, 180b, and 180c. Each of the driven gears 174, 176 is coupled to a respective tandem drive wheel which also are not shown in the figure for simplicity. Box beam 170 and the various drive, driven and idler gears mounted thereto is free to pivot about axis 182 which passes through the center of the drive gear 172 to allow for oscillating displacement of tandem drive wheels coupled to and rotated by the first and second driven gears 174 and 176. The drive arrangement of FIG. 7 eliminates the drive chain arrangement shown in FIG. 4.

Referring to FIG. 8, there is shown a plan view of yet another drive arrangement for dual tandem drive wheels in a combine in accordance with yet another embodiment of the present invention. In the drive arrangement of FIG. 8, the combine's diesel engine 186 is coupled by means of an aft drive shaft 190 to an aft differential 194. A forward drive shaft 192 couples the aft differential 194 to a forward differential 196. The aft and forward differentials 194, 196 are mounted to the combine's undercarriage 188. The aft differential 194 is coupled by means of a first drive axle 198 to a first planetary drive 202. The first planetary drive 202 is coupled to and rotationally displaces an aft pair of dual drive wheels 206a and 206b. Similarly, the aft differential 194 is coupled by means of a second drive axle 200 to a second planetary drive 204. The second planetary drive 204 is coupled to and rotationally displaces a second aft pair of dual drive wheels 208a and 208b. A similar drive coupling arrangement is provided between the forward differential 196 and two pairs of forward tandem drive wheels. The drive arrangement of FIG. 8 provides independent drive for the forward and aft dual tandem wheels. However, the drive arrangement of FIG. 8 does not allow for oscillating up and down displacement of the forward and aft tandem wheels as provided for in the embodiments of the invention previously described.

There has thus been shown an agricultural combine which includes oscillating forward tandem drive wheels and an upper body slidably mounted to a lower support frame, or undercarriage. The tandem drive wheel arrangement allows for oscillating vertical displacement of the drive wheels to provide a smooth ride over rough fields and a more uniform crop cutting height above the soil. The tandem drive wheel arrangement also provides a high degree of traction which may be increased by adding outer tandem wheels to form a dual tandem wheel drive system. The combine body is disposed on and coupled to the undercarriage in a slidable manner permitting the body to move forward to distribute the combine weight primarily over the tandem drive wheels for increased traction such as for operating in muddy fields and/or to accommodate larger grain loads. The combine body may also be slid rearward on the undercarriage to distribute sufficient weight over the aft steerable wheels to improve combine maneuverability such as in turning at the end of a field. The present invention further contemplates a track drive arrangement for a combine as well as a differential steering system wherein steering is provided by an independent track drive or braking arrangement.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A combine for harvesting grain comprising:
a lower support frame having a plurality of wheels including first and second pairs of forward tandem wheels and an aft pair of steerable wheels;
drive means coupled to said forward tandem wheels for displacing the combine;
an upper body including a forward header assembly for receiving grain-bearing crops, an intermediate crop threshing arrangement for separating the grain from crop residue, and a bin for storing the thus separated grain;
coupling means for connecting said upper body to said lower support frame in a sliding manner; and
displacement means coupled to said lower support frame and to said upper body for displacing said upper body between a forward position on said lower support frame wherein said upper body is disposed primarily over said forward tandem drive wheels for improved traction and stability and an aft position on said lower support frame wherein an increased portion of said upper body is disposed over said aft steerable wheels for improved maneuverability of the combine.

2. The combine of claim 1 wherein said displacement means includes a plurality of cross frame members fixedly coupled to said body and movably coupled to said lower support frame.

3. The combine of claim 2 wherein each of said cross frame members includes slide means for coupling said cross frame member to said lower support frame in a sliding manner.

4. The combine of claim 3 wherein said slide means includes a plurality of rollers coupled to each of said cross frame members and engaging said lower support frame.

5. The combine of claim 4 wherein said rollers are arranged in upper and lower roller pairs in each of said cross frame members for engaging respective upper and lower portions of said lower support frame.

6. The combine of claim 5 wherein said lower support frame is of a generally rectangular, tubular cross section.

7. The combine of claim 1 wherein said displacement means includes a hydraulic cylinder coupled to a hydraulic pressure source.

8. The combine of claim 7 wherein said displacement means further includes a cross frame member fixedly connected to said upper body and movably coupled to said lower support frame in a sliding manner, wherein said cross frame member is further coupled to said hydraulic cylinder and is displaced thereby.

9. The combine of claim 1 wherein said drive means includes first and second hydraulic motors respectively coupled to said first and second pairs of tandem wheels.

10. The combine of claim 9 wherein said drive means further includes first and second drive sprocket and drive shaft combinations coupled respectively to said first and second hydraulic motors.

11. The combine of claim 10 wherein said drive means further includes first and second driven sprocket and chain combinations respectively coupling said first drive sprocket and drive shaft combination to said first pair of tandem wheels and said second drive sprocket and drive shaft combination to said second pair of tandem wheels.

12. The combine of claim 10 further comprising first and second closed housings respectively enclosing said first drive sprocket and drive shaft combination and said second drive sprocket and drive shaft combination.

13. The combine of claim 10 wherein said drive means further includes means for allowing said first and second tandem wheels to respectively oscillate about said first and second drive shafts.

14. The combine of claim 9 wherein said drive means further includes a hydraulic pressure source and proportional flow control valve means coupled to said first and second hydraulic motors and further coupled to a steering wheel and responsive to turning of said steering wheel for differentially driving said first and second pairs of tandem wheels in propelling and providing steering for the combine.

15. The combine of claim 1 wherein said combine includes a diesel engine, and wherein said drive means includes a drive shaft and differential combination coupling said diesel engine to said first and second pairs of forward tandem wheels.

16. The combine of claim 15 wherein said drive means further includes first and second drive sprocket and drive shaft combinations respectively coupled to said first and second pairs of tandem wheels and to said drive shaft and differential combination.

17. The combine of claim 1 wherein said drive means includes first and second pluralities of gear arrangements respectively coupled to said first and second pairs of tandem wheels.

18. The combine of claim 17 further comprising first and second closed housings respectively containing said first and second pluralities of gear arrangements.

19. A combine for harvesting grain comprising:
a lower support frame having a plurality of wheels including forward drive wheels and aft steerable wheels;
drive means coupled to said forward drive wheels for displacing the combine;
an upper body including a forward header assembly for receiving grain-bearing crops, an intermediate crop threshing arrangement for separating the grain from crop residue, and a bin for storing the thus separated grain;
slidable coupling means for mounting said upper body to said lower support frame in a manner allowing for forward and aft sliding displacement of said upper body on said lower support frame; and
displacement means coupled to said lower support frame and to said upper body for displacing said upper body between a forward position on said lower support frame wherein said upper body is disposed primarily over said forward drive wheels for improved traction and an aft position on said lower support frame wherein said upper body is disposed sufficiently over said aft steerable wheels for improved maneuverability of the combine.

20. A system for driving and maneuvering a combine having an upper body and an undercarriage coupled to and supporting said body, said system comprising:
a pair of steerable wheels pivotally coupled to an aft portion of the undercarriage;
first and second pairs of tandem drive wheels coupled to a forward portion of the undercarriage; and
drive means coupled to said first and second pairs of tandem drive wheels for rotationally displacing said drive wheels and propelling the combine, said drive means including first and second hydraulic motors and first and second drive sprockets respectively coupled to said first and second hydraulic motors, said drive means further including first and second pairs of driven sprockets respectfully coupled to said first and second drive sprockets and further coupled to a respective drive wheel.

21. The system of claim 20 further comprising drive chains coupling said first drive sprocket to said first pair of driven sprockets and said second drive sprocket to said second pair of driven sprockets.

22. The system of claim 21 further including chain tightening means for maintaining said drive chains under tension.

23. The system of claim 21 further including first and second sealed housings respectively disposed about said first drive and driven sprockets and a drive chain and about said second drive and driven sprockets and a drive chain.

24. The system of claim 23 further comprising first and second pivoting coupling means for pivotally coupling said first drive and driven sprockets and said second drive and driven sprockets respectively to said undercarriage for allowing said tandem drive wheels to oscillate up and down as the combine moves.

25. The system of claim 24 further including first and second flexible, endless tracks disposed respectively about and driven by said first and second pairs of tandem drive wheels.

26. A system for driving and maneuvering a combine having an upper body and an undercarriage coupled to and supporting said body, said system comprising:
a pair of steerable wheels pivotally coupled to an aft portion of the undercarriage;
first and second paris of tandem drive wheels coupled to a forward portion of the undercarriage; and
drive means coupled to said first and second pairs of tandem drive wheels for rotationally displacing said drive wheels and propelling the combine, wherein said drive means includes a power source such as a motor or engine and first and second drive gears coupled to said power source and first and second pairs of driven gears respectively coupled to said first and second drive gears and further coupled to a respective drive wheel.

27. The system of claim 26 further including first and second drive shaft means for respectively coupling said first drive and driven gears and said second drive and driven gears.

28. The system of claim 26 further including first and second idler gear means for respectively coupling said first drive and driven gears and said second drive and driven gears.

29. The system of claim 26 wherein said first and second pairs of tandem drive wheels each include inner and outer dual wheels.

30. The system of claim 26 further including first and second differentials coupling said power source respectively to a forward pair of wheels and to an aft pair of wheels in said first and second pairs of tandem drive wheels.

* * * * *

UNITED STATES PATENT AND TRADEMARK OFFICE
CERTIFICATE OF CORRECTION

PATENT NO. : 5,290,201
DATED : March 1, 1994
INVENTOR(S) : Henry L. Tesker

It is certified that error appears in the above-indentified patent and that said Letters Patent is hereby corrected as shown below:

On the title page, item [54] line 1, and in column 1, line 2, in the title "MMOVEABLE" should be --MOVEABLE--.

| COLUMN | LINE | |
|---|---|---|
| 3 | 19 | "FIGS " should be --FIGS.-- |
| 3 | 48 | "FIGS " should be --FIGS.-- |
| 5 | 15 | After "frames" insert --on undercarriage 14. The forward and aft moveable cross frames -- |

Signed and Sealed this

Twenty-eighth Day of June, 1994

Attest:

BRUCE LEHMAN

Attesting Officer          Commissioner of Patents and Trademarks